United States Patent
De La Bruere Terreault

(10) Patent No.: US 9,791,047 B2
(45) Date of Patent: Oct. 17, 2017

(54) MAGNETIC SEAL SYSTEM WITH INTERNAL COOLING

(71) Applicant: PRATT & WHITNEY CANADA CORP., Longueuil (CA)

(72) Inventor: Julien De La Bruere Terreault, Ste-Anne-de-Sorel (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 15/005,464

(22) Filed: Jan. 25, 2016

(65) Prior Publication Data

US 2017/0211704 A1 Jul. 27, 2017

(51) Int. Cl.
  F16J 15/34 (2006.01)
  F16J 15/43 (2006.01)
  F16J 15/16 (2006.01)

(52) U.S. Cl.
  CPC ............ *F16J 15/43* (2013.01); *F16J 15/162* (2013.01)

(58) Field of Classification Search
  CPC  F16J 15/16; F16J 15/3444; F16J 15/40; F16J 15/43; F16J 15/162
  See application file for complete search history.

(56) References Cited

U.S. PATENT DOCUMENTS

| | | | | |
|---|---|---|---|---|
| 6,505,836 | B1* | 1/2003 | Toshihiko | F16J 15/342 |
| | | | | 277/400 |
| 7,883,093 | B2* | 2/2011 | Ueda | F16J 15/342 |
| | | | | 277/371 |
| 8,191,460 | B2* | 6/2012 | Tackett, Jr. | F04B 15/04 |
| | | | | 277/926 |
| 8,558,425 | B2 | 10/2013 | Stahlhut et al. | |
| 9,086,153 | B2* | 7/2015 | Neumann | B67C 3/22 |
| 2011/0169225 | A1* | 7/2011 | Winkler | F16J 15/3404 |
| | | | | 277/408 |
| 2011/0215533 | A1 | 9/2011 | Li et al. | |
| 2014/0154053 | A1* | 6/2014 | Roberts | F01D 11/00 |
| | | | | 415/121.3 |

(Continued)

FOREIGN PATENT DOCUMENTS

JP 8320083 A 5/1995

*Primary Examiner* — Gilbert Lee
(74) *Attorney, Agent, or Firm* — Norton Rose Fulbright Canada LLP

(57) ABSTRACT

An assembly comprises a shaft, and a support structure surrounding the shaft; and a magnetic seal system comprising an annular seal assembly including a ring sealingly mounted to a shaft to rotate therewith and slidingly axially displaceable along the shaft, and an annular seal supported by the ring. An annular magnet assembly is configured to be non-rotatingly supported adjacent to and surrounding the shaft, the annular magnet assembly configured and positioned relative to the ring to exert a sufficient attracting force on the ring to biasingly displace the ring axially along the shaft into sealing contact with the magnet. A cooling fluid feeding conduit, a cooling fluid exhaust conduit distinct from the cooling fluid feeding conduit are provided. An annular cavity is defined at least partially by or in a radially outer surface of the annular magnet, the annular cavity being in fluid communication with the cooling fluid feeding conduit, and with the cooling fluid exhaust conduit, for circulation of cooling fluid in the annular cavity.

20 Claims, 3 Drawing Sheets

(56) References Cited

U.S. PATENT DOCUMENTS

2014/0265142 A1\* 9/2014 Tissakht ............... F16J 15/3444
　　　　　　　　　　　　　　　　　　　　　　277/358
2014/0286599 A1\* 9/2014 Devitt ................. F16C 32/0618
　　　　　　　　　　　　　　　　　　　　　　384/101

\* cited by examiner

MAGNETIC SEAL SYSTEM WITH INTERNAL COOLING

TECHNICAL FIELD

The application relates generally to magnetic seals of the type used to seal a rotating shaft and, more particularly, to cooling of such magnetic seals.

BACKGROUND OF THE ART

Magnetic seals are sometimes used for non-contact sealing in rotating systems like gas turbine engines. The high speeds at which these engines run, however, often requires cooling of the seals. Although oil can be used to cool the hot seal surfaces, this can also cause additional oil leakage through the sealing interface, decreasing the overall effectiveness of the seal. Room for improvement exists.

SUMMARY

In one aspect, there is provided a magnetic seal system comprising: an annular seal assembly including a ring, the ring configured to be sealingly mounted to a shaft to rotate therewith and slidingly axially displaceable along the shaft, and an annular seal supported by the ring; an annular magnet assembly configured to be non-rotatingly supported adjacent to and surrounding the shaft, the annular magnet assembly configured and positioned relative to the ring to exert a sufficient attracting force on the ring to biasingly displace the ring axially along the shaft into sealing contact with the magnet, the magnet at least partially defining an annular cavity at least partially by or in a radially outer surface of the annular magnet, the annular cavity being in fluid communication with a cooling fluid inlet and a cooling fluid exhaust distinct from the inlet.

In a second aspect, there is provided an assembly comprising: a shaft; a support structure surrounding the shaft; and a magnetic seal system comprising an annular seal assembly including a ring sealingly mounted to a shaft to rotate therewith and slidingly axially displaceable along the shaft, and an annular seal supported by the ring; an annular magnet assembly non-rotatingly supported adjacent to and surrounding the shaft, the annular magnet assembly positioned relative to the ring to exert a sufficient attracting force on the ring to biasingly displace the ring axially along the shaft into sealing contact with the magnet, a cooling fluid feeding conduit, a cooling fluid exhaust conduit distinct from the cooling fluid feeding conduit, and an annular cavity defined at least partially by or in a radially outer surface of the annular magnet, the annular cavity being in fluid communication with the cooling fluid feeding conduit, and with the cooling fluid exhaust conduit, for circulation of cooling fluid in the annular cavity.

In a third aspect, there is provided a method for cooling an annular magnet of a magnetic seal assembly sealing a gap between a shaft and a support structure, the method comprising: feeding cooling fluid to an annular cavity surrounding the annular magnet via a first conduit; circulating the cooling fluid in the annular cavity such that the cooling fluid flows directly against a radially outer surface of the annular magnet; and exhausting the cooling fluid via a second conduit distinct from the first conduit.

Further details of these and other aspects of the present invention will be apparent from the detailed description and figures included below.

DESCRIPTION OF THE DRAWINGS

Reference is now made to the accompanying figures, in which.

DETAILED DESCRIPTION OF THE PREFERRED EMBODIMENTS

Figure 1:
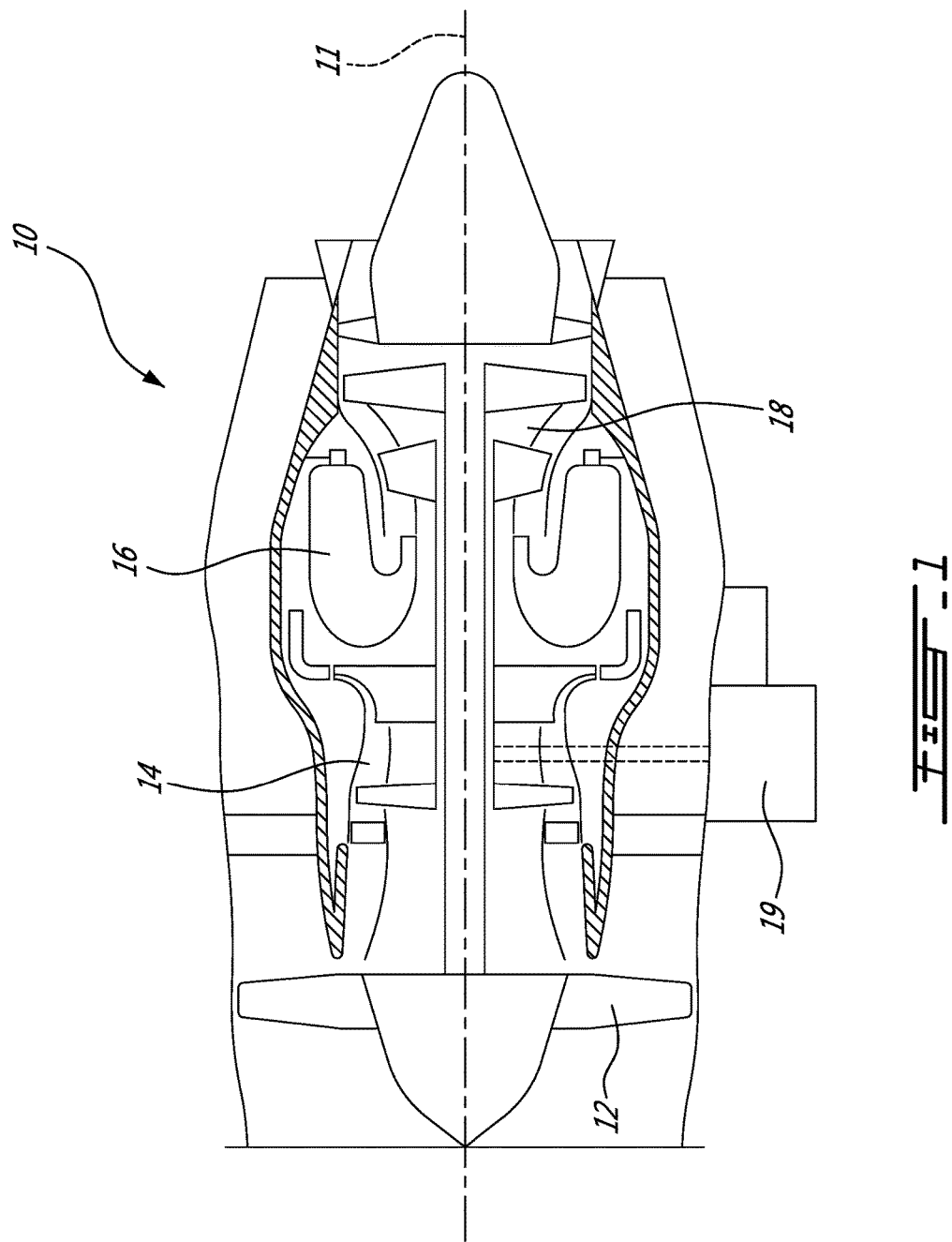
FIG. 1 is a schematic cross-sectional view of a turbofan gas turbine engine.

FIG. 1 illustrates a turbofan gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. An accessory gearbox 19 may be driven by either one of the compressor 14 and the turbine section 18.

Figure 2:
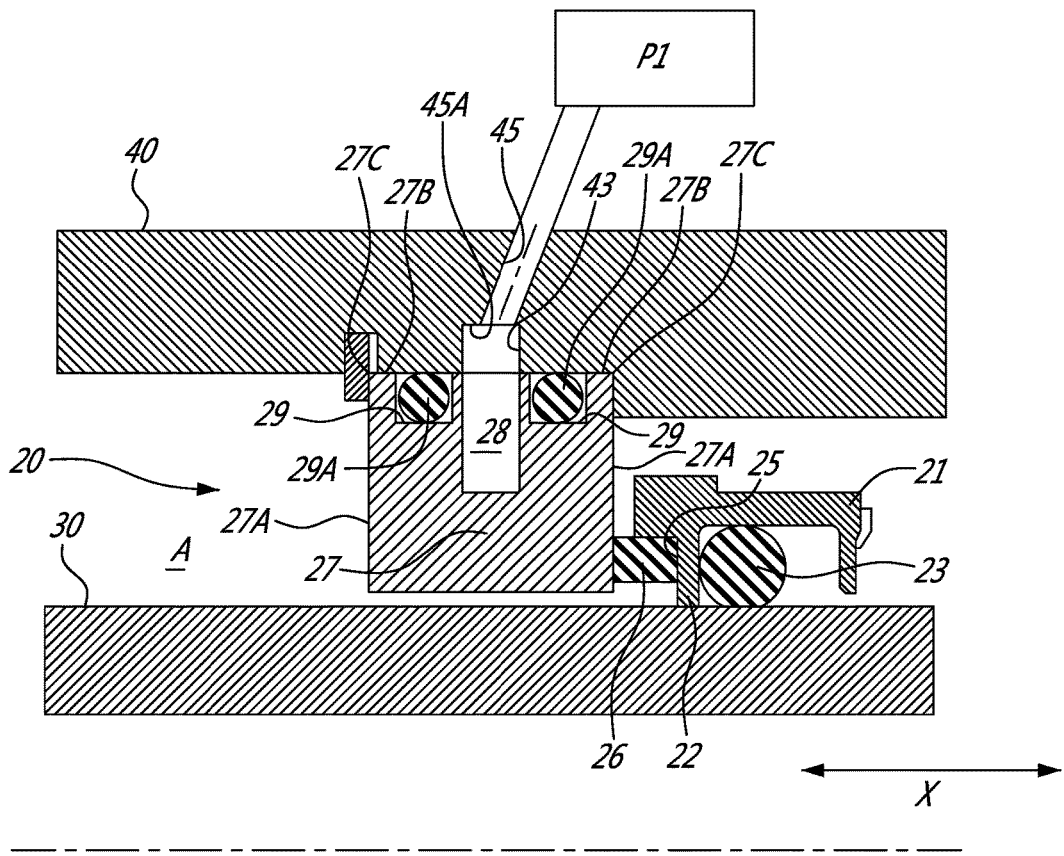
FIG. 2 is a schematic sectional view of a magnetic seal system in accordance with an embodiment of the present disclosure.
Figure 2:
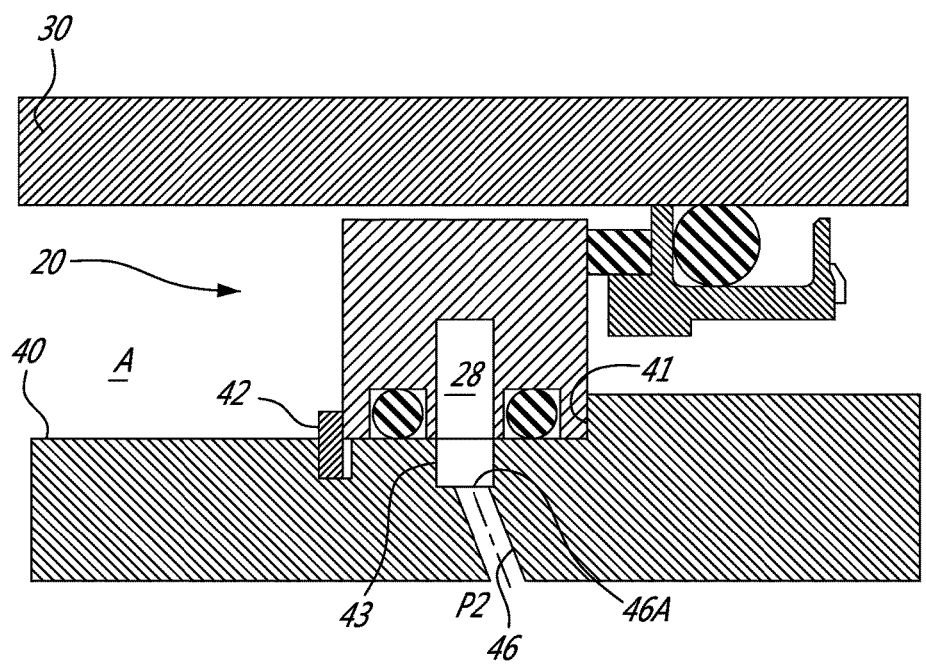

Referring to FIG. 2, a magnetic seal system in accordance with the present disclosure is generally shown at 20, for instance of the type used in the accessory gearbox 19 of the gas turbine engine 10. It is also contemplated to use the magnetic seal system 20 in other applications as well. For example, the magnetic seal system 20 can be used as an output shaft seal on a turboshaft and turboprop engines, as well as a bearing cavity seal on engine mainshafts. The magnetic seal system 20 is used to seal a space A between a shaft 30 and a support structure 40 (i.e., a structure of the apparatus using the magnetic seal system 20, a housing thereof, etc), to block fluid passage through the space A. In the illustrated embodiment, the space A is an annular space.

The magnetic seal system 20 comprises an annular seal assembly including a mating ring 21, also known as seal runner. The mating ring 21 typically consists of a structurally rigid material, such as a metal, with a ferromagnetic content. The mating ring 21 is mounted to the shaft 30 to rotate therewith by friction action of a seal 23, such that the mating ring 21 may move in translation along the shaft. In other words, the mating ring 21 is secured to the shaft 23 to rotate with it, but a sufficient force can be used to displace the mating ring 21 along the shaft 30. Accordingly, the mating ring 21 is axially displaceable along the shaft 30, in axial direction X. One or more seals 23 may be provided to seal off an interface between the mating ring 21 and the shaft 30. For instance, the seal 23 may be an O-ring, a gasket, etc, made of a material capable of withstanding the pressures and temperatures in the apparatus. Moreover, the material must be resistant to the nature of ambient fluids (e.g., oil).

The mating ring 21 defines a shoulder 25 that is configured to receive thereon an annular seal 26, part of the annular seal assembly. The annular seal 26 forms part of the dynamic seal interface of the magnetic seal system 20, as it will rotate with the mating ring 21 and the shaft 30, while rubbing against an annular magnet 27, part of an annular magnet assembly. The annular seal 26 is therefore connected to the mating ring 21 to rotate with it. In the illustrated embodiment, the shoulder 25 provides a pair of abutment surfaces for the annular seal 26, to strengthen the connection between the annular seal 26 and the mating ring 21 and cause concurrent rotation. Other arrangements are contemplated, such as an annular groove in the mating ring 21 to accommodate a portion of the annular seal 26. The annular seal 26 is made of a material that will wear off gradually, while forming a contact surface conforming to the component it will rub against, to create the dynamic seal interface. For example, the annular seal 26 is made of carbon, or equivalent.

The annular magnet 27 is connected to the support structure 40, in manners described hereinafter. The annular magnet 27 is sized to surround the shaft 30, yet not contact it. The annular magnet 27 exerts an attracting force, such that the mating ring 21 is drawn toward the annular magnet 27. As it is movable on the shaft 30 in direction X, the mating ring 21 presses the annular seal 26 against one of the lateral surfaces 27A of the annular magnet 27. The annular contact interface between the annular seal 26 and the lateral surface 27A of the magnet 27 is therefore the dynamic seal interface, blocking fluid from passing through the space A.

The annular magnet 27 also has a radially outer surface 27B. The surface 27B is said to be a radially outer due to its positional relation to the shaft 30. The radially outer surface 27B shares edges 27C with the lateral surfaces 27A, and is the surface between these edges 27C. As shown in FIG. 2, the radially outer surface 27B may have a hollow annular cavity 28 defined therein. The hollow annular cavity 28 defines an empty space therein. The annular cavity 28 may form a full annulus, or may have an axial wall therein to define a C as opposed to a full annulus. The annular cavity 28 may be machined or cast into the annular magnet 27. Annular seal cavities 29 may be provided on opposed sides of the annular cavity 28, each being defined to receive at least one seal 29A therein. For instance, the seals 29A may each be an O-ring, a gasket, etc, made of a material capable of withstanding the pressures and temperatures in the apparatus, and resistant to the nature of ambient fluids, such as oil. Axial or corner seals could be used as alternatives to the annular seal cavities 29. It is contemplated to construct the annular magnet 27 and the support structure 40 is such a way that the interface therebetween does not require additional seals such as the seals 29A.

Still referring to FIG. 2, the support structure 40 is shown defining an abutment shoulder 41 against which the annular magnet 27 may be abutted. A locking ring 42 may block the annular magnet 27 in the axial direction X, for the annular magnet 27 to be held captive in the manner shown in FIG. 2. Alternatives to the locking ring 42 are considered, such as a threaded lock sleeve, additional structure, etc, to hold the annular magnet 27 captive in the support structure 40.

The support structure 40 may also have an annular cavity 43 machined therein, and axially aligned with the annular magnet 27. In the illustrated embodiment, a common annular cavity is defined by the combination of annular cavities 28 and 43, each forming an annular cavity portion. This common annular cavity is connected to a source of cooling fluid, via a cooling fluid feeding conduit 45 and an outlet 45A thereof. The common annular cavity is also connected to a cooling fluid exhaust conduit 46 via an inlet 46A thereof, distinct from the feeding conduit 45, for the exhaust of the cooling fluid from the annular cavity. As a result, cooling fluid may circulate in the annular cavity by this arrangement of distinct conduits 45 and 46, for the cooling fluid to absorb heat of the annular magnet 27. Hence, the cooling fluid is in direct contact with the annular magnet 27.

While a common annular cavity consisting of the combination of the annular cavities 28 and 43 (which hence form cavity portions), the annular cavity may consist of a single one of the annular cavities 28 and 43. If the arrangement is without the annular cavity 43, as in FIG. 3, the feeding conduit 45 would feed the cooling fluid directly into the annular cavity 28 via its outlet 45A. Alternatively, if the arrangement is without the annular cavity 28, as in FIG. 4, the feeding conduit 45 would feed the cooling fluid directly into the annular cavity 43 via its outlet 45A, but the cooling fluid would still come into contact with the radially outer surface 27B, as the annular cavity 43 is open to the radially outer surface 27B. It is observed that the arrangement featuring the annular cavity 28, with or without the annular cavity 43, offers greater heat exchange surface with the material of the annular magnet 27, in comparison to an arrangement without the annular cavity 28.

Figure 3:
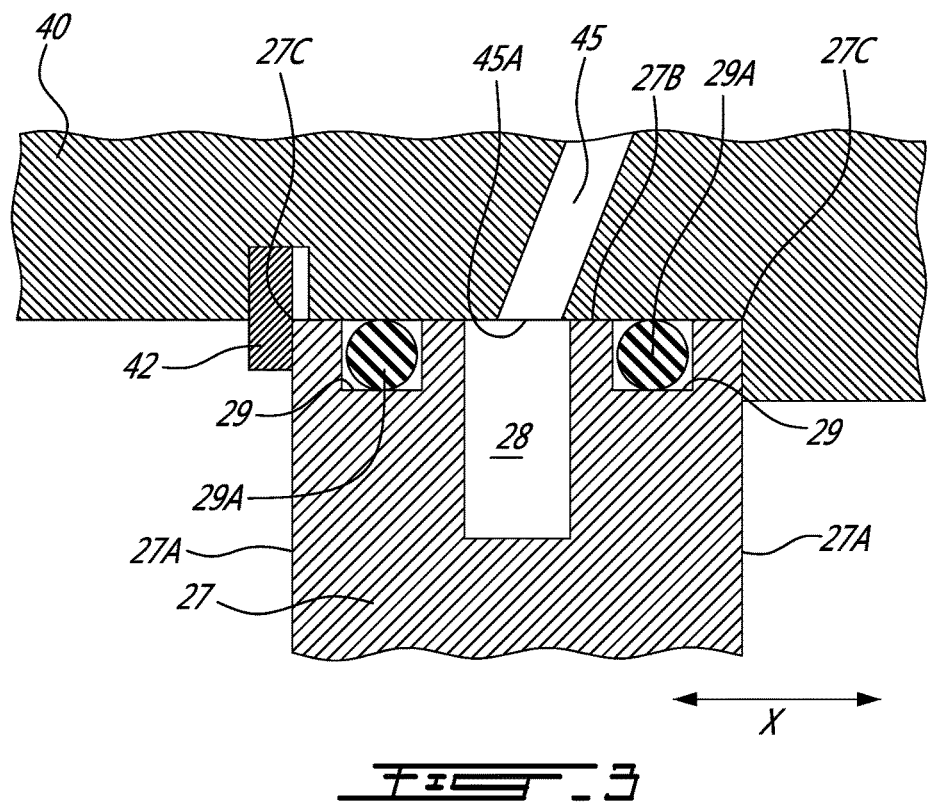
FIG. 3 is a schematic sectional view of a magnetic seal system in accordance with another embodiment of the present disclosure.
Figure 4:
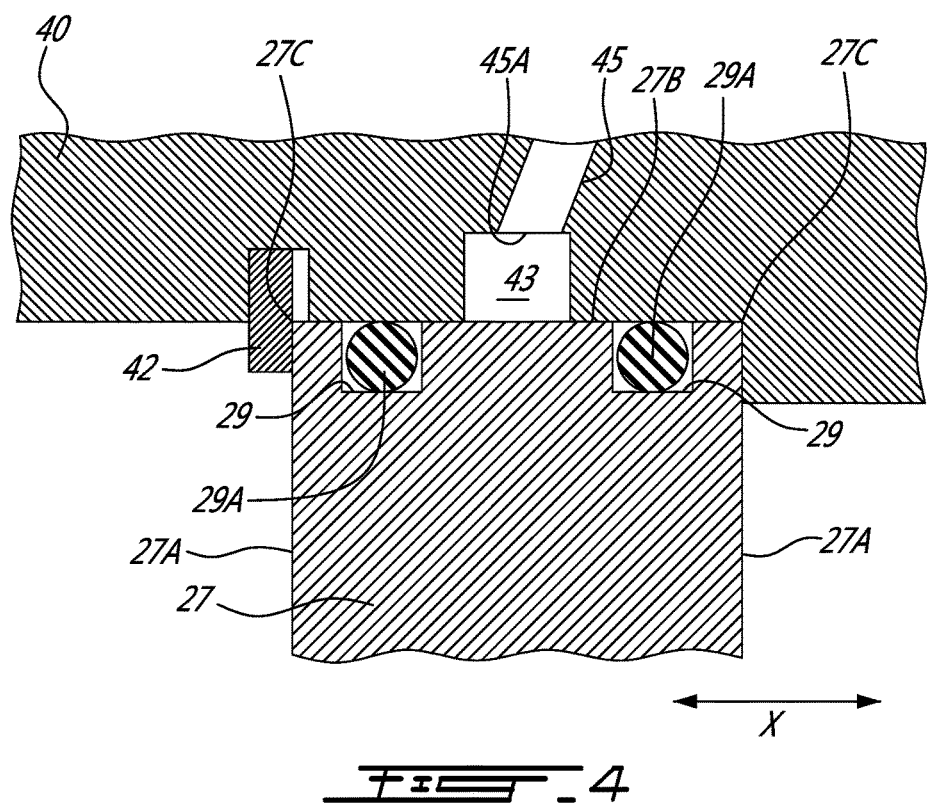
FIG. 4 is a schematic sectional view of a magnetic seal system in accordance with yet another embodiment of the present disclosure.

Hence, the annular cavity, as in any one of FIGS. 2, 3 and 4, is entirely circumscribed or defined by the annular magnet 27 and the support structure 40, and does not rely on other members such as seals to define its boundaries. Seals 29A may help prevent leaks, but do not define the annular cavity. Hence, the annular cavity is said to provide internal cooling, as the system preserves the cooling fluid in a closed cavity, the cooling fluid not being misted out to the environment of space A. The annular cavity is bound by the rigid walls of the annular magnet 27 and of the support structure 40.

In an embodiment, the outlet of the feeding conduit 45 and the inlet of the exhaust conduit 46 are generally diametrically opposed, to ensure a suitable surrounding flow of cooling fluid around the annular magnet 27. The expression "generally" is used to indicate that the conduits 45 and 46 may be offset by a few degrees from being substantially diametrically opposed. If the annular cavity is C-shaped, the outlet of the feeding conduit 45 and the inlet of the exhaust conduit 46 are at opposed ends of the C.

The feeding conduit 45 and the exhaust conduit 46 may be machined or fabricated directly in the support structure 40. Alternatively, the feeding conduit 45 and the exhaust conduit 45 may be separate tubes, pipes and/or conduits extending to and from the annular cavity.

The cooling fluid may be cooling air or cooling oil, supplied by cooling fluid source P1 connected to the feeding conduit 45. The exhaust conduit 46 may be connected to a scavenge cavity, a tank, or any other component collecting the cooling fluid, generally shown at P2. In an embodiment, the pressure at P1 is greater than that at P2, to induce a flow of the cooling oil from P1 to P2. Hence, the pressure differential between P2 and P1 is negative during use.

The magnetic seal system 20 may therefore operate a cooling method that follows. Cooling fluid is fed to the annular cavity surrounding the annular magnet 27 via a first conduit, the feeding conduit 45. The cooling fluid is circulated in the annular cavity 28 and/or 43 such that the cooling fluid flows directly against a radially outer surface of the annular magnet 27. The cooling fluid is exhausted via a second conduit, the exhaust conduit 46, distinct from the first conduit 45. The feeding and exhausting of the cooling fluid may comprise creating a negative pressure differential between the second conduit 46 and the first conduit 45. The feeding and exhausting of the cooling fluid may also comprise inletting the cooling fluid in the annular cavity 28 and/or 43 at a location generally diametrically opposed to that of outletting the cooling fluid.

The above description is meant to be exemplary only, and one skilled in the art will recognize that changes may be made to the embodiments described without departing from the scope of the invention disclosed. For example, the magnetic seal system 20 may be found in reduction gearboxes, or to seal a space between a shaft and surrounding structure in other environments. The annular magnet 27, although shown as an integral monolithic magnet, may be a non-magnet ring, supporting a plurality of discrete magnets, provided such discrete magnets produce sufficient attracting forces to displace the annular seal assembly as the annular seal 26 wears. Although not shown, anti-rotation features may be provided (lugs, keys) to ensure that the annular magnet 27 is fixed relative to the support structure 40, and to ensure that the mating ring 21 rotates with the shaft 30 while being axially displaceable thereon. Still other modifications which fall within the scope of the present invention will be apparent to those skilled in the art, in light of a review of this disclosure, and such modifications are intended to fall within the appended claims.

What is claimed is:

1. A magnetic seal system comprising:
    an annular seal assembly including a ring, the ring configured to be sealingly mounted to a shaft to rotate therewith and slidingly axially displaceable along the shaft, and an annular seal supported by the ring; and
    an annular magnet assembly including an annular magnet connected to a support structure, the annular magnet assembly configured to be non-rotatingly supported adjacent to and surrounding the shaft, the annular magnet assembly positioned relative to the ring to exert a sufficient attracting force on the ring to biasingly displace the ring axially along the shaft into sealing contact with the annular magnet, the annular magnet at least partially defining an annular cavity at least partially by or in a radially outer surface of the annular magnet, the annular cavity defining a hollow flow path entirely circumscribed by the annular magnet and the support structure, the flow path of the annular cavity being in fluid communication with a cooling fluid inlet and a cooling fluid exhaust distinct from the inlet.

2. The magnetic seal system according to claim 1, wherein the annular cavity is formed in the radially outer surface of the annular magnet assembly.

3. The magnetic seal system according to claim 2, further comprising annular seal cavities on opposed sides of the annular cavity, and at least one seal in each said annular seal cavities adapted to seal an interface between the annular magnet and the support structure.

4. The magnetic seal system according to claim 1, wherein the cooling fluid inlet in the annular cavity, and the cooling fluid exhaust in the annular cavity are generally diametrically opposed.

5. The magnetic seal system according to claim 1, wherein the annular magnet including the annular cavity and the hollow flow path is monolithic.

6. An assembly comprising:
    a shaft;
    a support structure surrounding the shaft; and
    a magnetic seal system comprising
        an annular seal assembly including a ring sealingly mounted to a shaft to rotate therewith and slidingly axially displaceable along the shaft, and an annular seal supported by the ring,
        an annular magnet assembly non-rotatingly supported adjacent to and surrounding the shaft, the annular magnet assembly including an annular magnet positioned relative to the ring to exert a sufficient attracting force on the ring to biasingly displace the ring axially along the shaft into sealing contact with the annular magnet,
        a cooling fluid feeding conduit,
        a cooling fluid exhaust conduit distinct from the cooling fluid feeding conduit, and
        an annular cavity defined at least partially by or in a radially outer surface of the annular magnet, the annular cavity defining a hollow flow path entirely circumscribed by the annular magnet and the support structure, the flow path of the annular cavity being in fluid communication with the cooling fluid feeding conduit, and with the cooling fluid exhaust conduit, for circulation of cooling fluid in the annular cavity.

7. The assembly according to claim 6, wherein the annular cavity is formed in the radially outer surface of the annular magnet.

8. The assembly according to claim 7, further comprising annular seal cavities on opposed sides of the annular cavity, and at least one seal in each said annular seal cavities to seal an interface between the annular magnet and the support structure.

9. The assembly according to claim 6, wherein an outlet of the cooling fluid feeding conduit in the annular cavity, and an inlet of the cooling fluid exhaust conduit are generally diametrically opposed.

10. The assembly according to claim 6, wherein the annular cavity is formed in the support structure and is delimited radially inwardly by the radially outer surface of the annular magnet.

11. The assembly according to claim 6, wherein the cooling fluid feeding conduit and the cooling fluid exhaust conduit are defined in the support structure.

12. The assembly according to claim 6, wherein the cooling fluid feeding conduit is connected to a pressurized source of cooling fluid, whereby a pressure differential between a pressure in the cooling fluid exhaust conduit and a pressure in the cooling fluid feeding conduit is negative, during use.

13. The assembly according to claim 6, wherein the annular cavity comprises a first annular cavity portion formed in the support structure, and a second annular cavity portion formed in the radially outer surface of the annular magnet, the first annular cavity portion and the second annular cavity portion being axially aligned to concurrently form the annular cavity.

14. The assembly according to claim 6, wherein the cooling fluid feeding conduit is connected to a pressurized source of cooling fluid, the cooling fluid being oil.

15. The assembly according to claim 6, wherein the annular magnet including the annular cavity and the hollow flow path is monolithic.

16. A method for cooling an annular magnet of a magnetic seal assembly sealing a gap between a shaft and a support structure, the method comprising:
    feeding cooling fluid to an annular cavity surrounding the annular magnet via a first conduit;
    circulating the cooling fluid in the annular cavity in a hollow flow path entirely circumscribed by the annular magnet and the support structure such that the cooling fluid flows directly against a radially outer surface of the annular magnet; and
    exhausting the cooling fluid via a second conduit distinct from the first conduit.

17. The method according to claim 16, wherein feeding the cooling fluid comprises feeding oil.

18. The method according to claim 16, wherein feeding and exhausting the cooling fluid comprises creating a negative pressure differential between the second conduit and the first conduit.

19. The method according to claim 16, wherein feeding and exhausting the cooling fluid comprises feeding the cooling fluid into the annular cavity at a location generally diametrically opposed to a location where cooling fluid is exhausted.

20. The method according to claim 16, wherein circulating the cooling fluid in the annular cavity comprises circulating the cooling fluid in at least one of the support structure and the annular magnet.

* * * * *